C. H. DAVIS & A. D. CUFF.
MILKING MACHINE.
APPLICATION FILED JUNE 2, 1914.
1,159,185.
Patented Nov. 2, 1915.
3 SHEETS—SHEET 1.
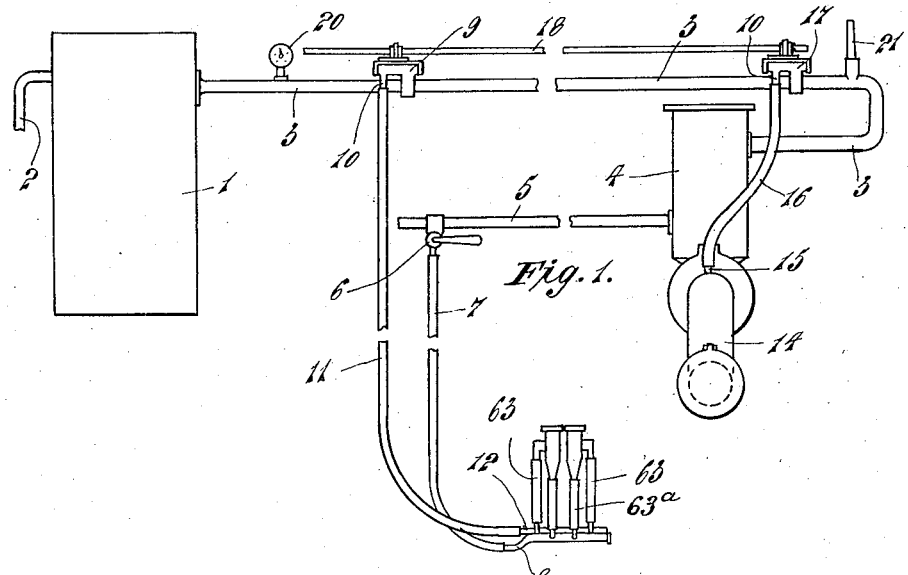
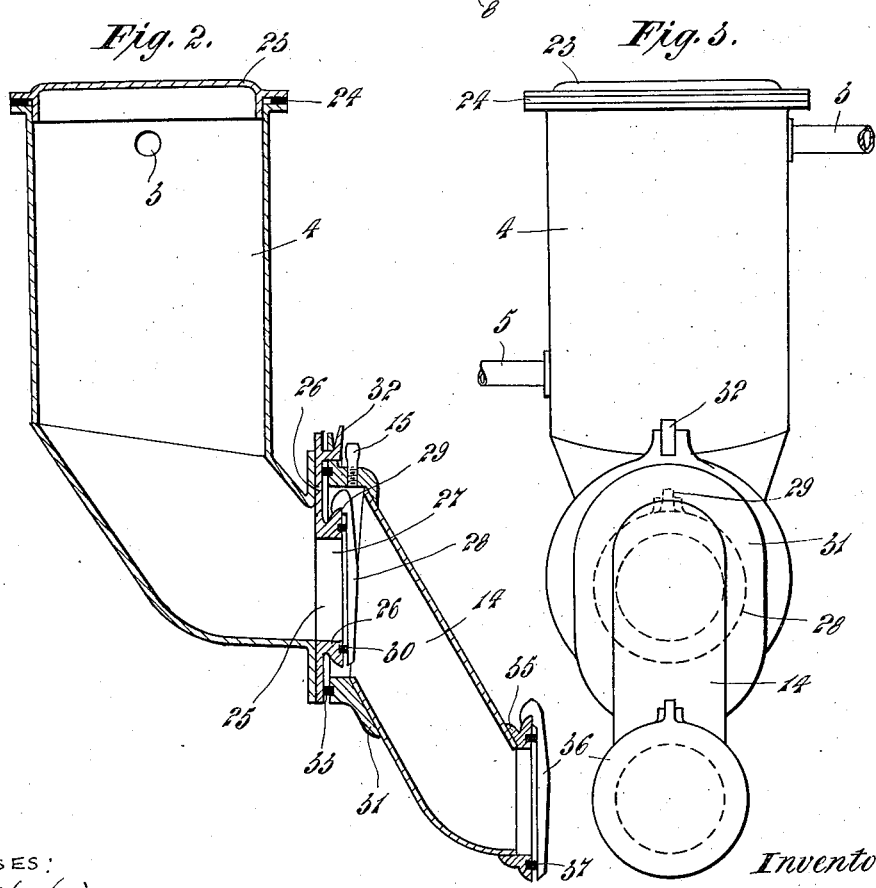

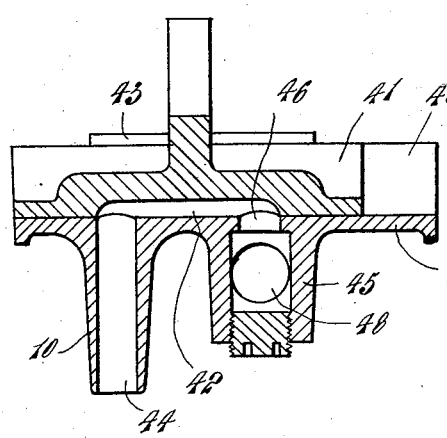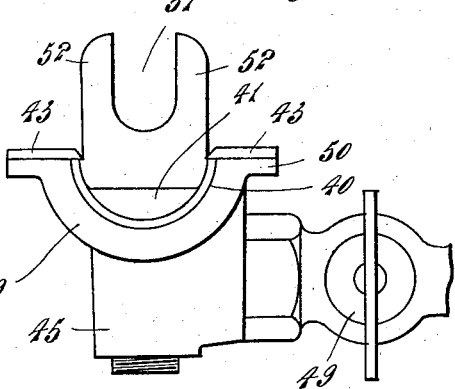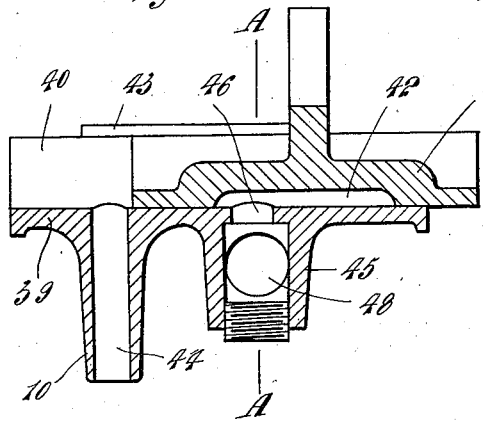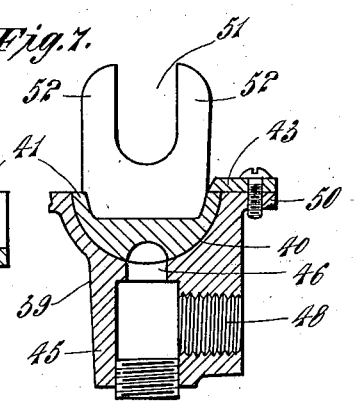

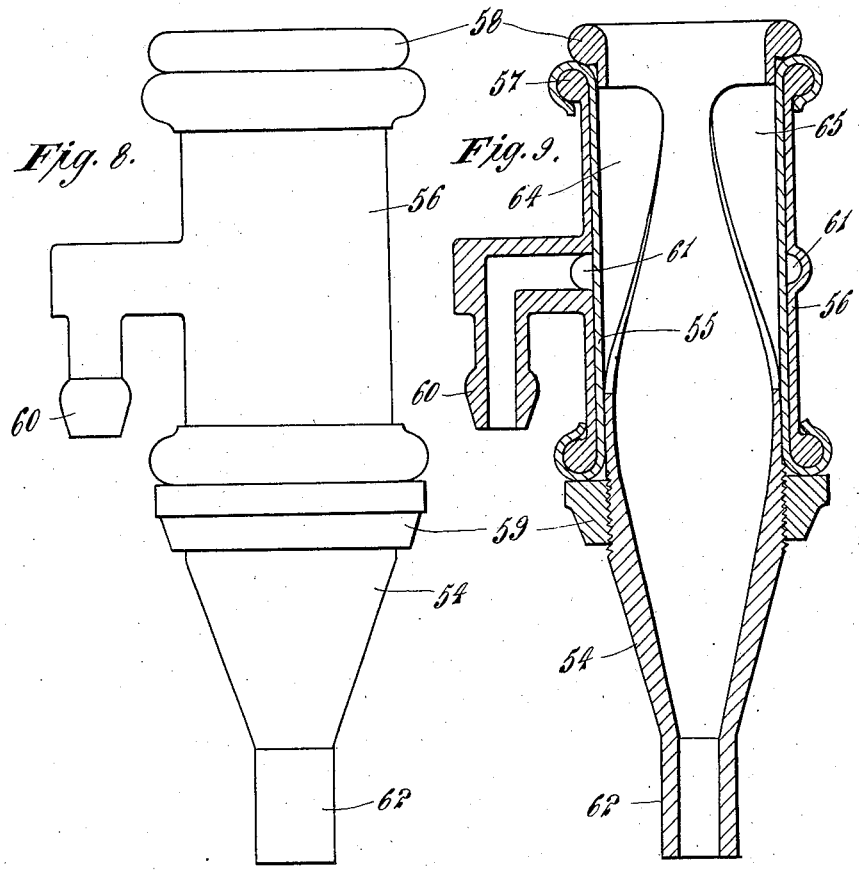
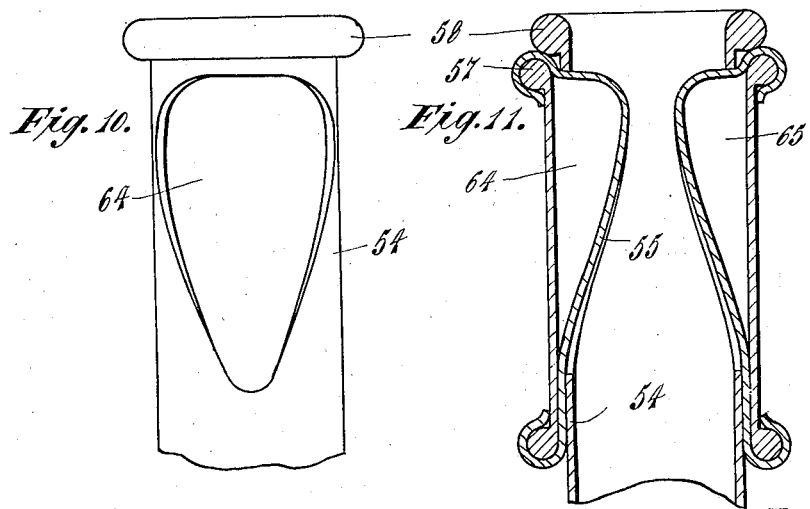

UNITED STATES PATENT OFFICE.

CLAUDE HUDSON DAVIS, OF WANGANUI, AND ALAN DEVEREAUX CUFF, OF GONVILLE, WANGANUI, NEW ZEALAND.

MILKING-MACHINE.

1,159,185.  Specification of Letters Patent.  Patented Nov. 2, 1915.

Application filed June 2, 1914. Serial No. 842,353.

*To all whom it may concern:*

Be it known that we, CLAUDE HUDSON DAVIS and ALAN DEVEREAUX CUFF, subjects of the King of Great Britain, residing at No. 10 Church Place, Wanganui, New Zealand, and "Manuwahe," Carlton Terrace, Gonville, Wanganui, New Zealand, respectively, have invented new and useful Improvements in Milking-Machines; and we do hereby declare the following to be a full, clear, and exact description of the same.

This invention relates to vacuum milking machines in which the milk extracted from the teats is drawn into a receiving chamber and thence ejected without breaking down the vacuum in the pipe lines, and in which the pulsation of the inner lining of the teat cups is produced by alternately extracting air from, and in admitting air to an annular space between said inner lining and the rigid outer wall of the teat cup.

The object of the present invention is to provide improvements in the ejecting means, teat cups and pulsating means in order to simplify the construction and arrangement of the machine and to render the same more efficient.

The invention will be described with the aid of the accompanying drawings and the novel features will be pointed out in the claims.

Figure 1 is a side view showing the parts of the machine comprising this invention assembled. Fig. 2 is a side sectional elevation of the releaser apparatus. Fig. 3 is a front elevation thereof. Fig. 4 is a sectional elevation, and Fig. 5 an end elevation of the pulsator apparatus, showing the valve at one end of its stroke. Fig. 6 is a view corresponding to Fig. 4 showing the valve at the opposite end of its stroke. Fig. 7 is a cross sectional elevation on line A—A Fig. 6. Fig. 8 is an exterior view and Fig. 9 a sectional elevation of the teat cup. Fig. 10 is a side elevation of the inner casing. Fig. 11 is a part view and similar to Fig. 9 but showing the rubber lining collapsed.

Referring to the drawings and first to Fig. 1 the usual vacuum tank 1 is provided, and exhausted of air by a vacuum pump (not shown on the drawing) to which is connected the pipe 2. The main vacuum pipe 3 leads from the tank 1 to the receiver 4 of the ejector apparatus. To this receiver the main milk pipe 5 leads. Attached to the milk pipe 5 is a cock 6 from which a flexible pipe 7 leads to the milk portion 8 of the milk claw.

A pulsator apparatus 9 is connected to the vacuum pipe 3, and from a nipple 10 thereof a flexible pipe 11 leads to the vacuum half 12 of the milk claw.

The receiver 4 of the ejector has a chamber 14 (hereinafter to be described) having a nipple 15 from which leads a flexible pipe 16 to the nipple 10 of the pulsator 17 identical with the pulsator 9 and connected to the pipe 3. The valves of the pulsators are operated by a rod 18 which may be reciprocated by any suitable means such as an eccentric and rod from a revolving counter-shaft. The vacuum pipe 3 is fitted with the usual vacuum gage 20 and relief valve 21.

Upon a vacuum being created in the tank 1 air is exhausted from the pipe 3, receiver 4, milk pipe 5 and the interior of the teat cups; and upon reciprocation of the rod 18 the pulsators 9 will alternately extract air from and admit it to the annular space between the inner lining and the outer wall of the teat cups, thus operating the teat cups and extracting milk from the teats. The milk immediately flows along the pipe 7, pipe 5 and into the receiver 4. When air is extracted from the chamber 14 by the pulsator 17 the milk flows from the receiver 4 into the said chamber and is ejected therefrom when the air is again admitted to the chamber 14 by the pulsator as will be described below.

Figs. 2 and 3 illustrate the ejector apparatus which comprises the receiver 4 to which enters the milk pipe 5 and vacuum pipe 3 as shown. The lid 23 closes the top of the receiver which is rendered air-tight by means of a rubber ring 24. The lower end of the receiver 4 tapers as shown in the figures and is provided with an opening 25 in the front thereof, while a valve seating 26 having an opening 27 is fixed to the front face of the receiver, the opening 27 being opposite the opening 25. A flap valve 28 of the swinging type is pivoted at 29 to the valve seating while a rubber ring 30 embedded in a groove in the valve seating enables the flap valve 28 to make an air-tight joint with the valve seating. The ejector chamber 14 is of any suitable shape, but preferably as shown in Fig. 2, and has a flange ring 31 fixed to its upper end which ring has a perforated projection engaging over a lug 32 projecting from the upper part of the valve seating 26. A rubber ring 33 embedded in a groove provided in the face of the ring 31 makes an air-tight joint between the chamber 14 and the seating 26. It will be seen from the manner in which the receiver 14 is attached that the joint is made air-tight by virtue of the weight of the chamber which may be easily removed for the purpose of cleaning. The pipe 16 attached to the nipple 15 connects the chamber 14 with the pulsator (see Fig. 1). At the lower end of the ejector chamber 14 a valve seating 35 is provided. Pivoted on the upper end of the valve seating is a flap valve 36 while a rubber ring 37 in the valve seating insures an airtight joint being made with the valve 36. Upon air being exhausted from the receiver 4 by the pipe 3 the milk flows into the receiver and falls to the bottom thereof. Then when air is exhausted from the chamber 14 by means of the pulsator 17 an equilibrium of pressure is caused in the receiver 4 and the chamber 14. The milk then flows into the ejector chamber 14 which being exhausted of air the milk will be entrapped therein. Upon, however, the next pulsation taking place so that the interior of the chamber 14 is again brought to atmospheric pressure the flap valve 28 will close and the valve 36 will be opened by the weight of the milk. Immediately the milk has passed through the valve 36 the chamber 14 will again be exhausted of air and cause the valve 36 to close.

Referring now to Figs. 4 to 7 inclusive the pulsator comprises a casing 39 having a semi-circular valve race 40. Within this valve race a slide valve 41 having a recess 42 is reciprocated. The casing 39 is provided with an integral nipple 10 hereinbefore referred to from which the flexible pipe 11 leads to the milk claw, and thence communicates with the annular space between the flexible inner lining and outer wall of the teat cups. A port 44 leads through this nipple 10 to the valve race. An integral boss 45 projects from the casing 39 through which leads the port 46 to the valve race. A port 48 leads from the port 46 through the tap 49 to the vacuum pipe 3. When the slide valve 41 is moved into the position shown in Fig. 4, the ports 44, 46 and 48 are in communication and the vacuum is produced in the annular space of the teat cups. When the valve is moved to the other end of its stroke as shown in Fig. 6 the port 44 is opened to the atmosphere which flows into the annular space and compresses the flexible lining upon the teat. The valve 41 is of the same design at both ends, and there is therefore no danger of its being placed in the wrong position. Guides 43 screwed to flanges 50 of the casing retain the valve within the race. The rod 18 (see Fig. 1) by which the valve is reciprocated engages in the recess 51 between the lugs 52 (see Figs. 5 and 7). The valve race being semi-circular is easily manufactured as also is the slide valve which fits upon it.

Figs. 8 to 11 illustrate the teat cup which comprises a metal inner casing 54, the rubber lining 55 of which envelops the upper portion of the casing as shown in the figures. The outer casing 56 fits over the rubber lining 55 the ends thereof being turned back upon the beads 57 of the outer casing. The upper end of the inner casing 54 is beaded at 58, which bead is adapted to be forced against the rubber lining when a nut 59 which is threaded upon the inner casing is screwed up against the other end of the lining. By means of this nut the space between the rubber lining 55 and the outer casing 56 is rendered air-tight with the atmosphere and the exterior of the cup is also rendered substantially air-tight.

The outer casing 56 has a nipple 60 to which the pipe 63 connecting through the claw with the pipe 11 from the pulsator 9 is connected. The nipple is attached at a convenient height upon the outer casing while a port 61 is provided around the inner circumference of the outer casing in order that air pressure may be equally distributed around the rubber lining 55. The lower end of the inner casing is tapered and is provided with a nipple 62 to which the pipe 63$^a$ from the milk claw is attached (see Fig. 1).

Openings 64 and 65 are provided at suitable points in the inner casing. These openings are preferably of the shape shown in Figs. 9 and 10 in order to insure that the upper part of the rubber lining will collapse to a greater extent than the lower part. In Fig. 9 the rubber lining is shown in the position it assumes when there is an equilibrium of pressure upon the interior of the cup and upon the interior of the outer casing, and in Fig. 11 it is shown in the position it assumes when the space between the rubber lining and outer casing is brought to atmospheric pressure.

The interior of the teat cup when in working position is exhausted of air, and upon the pulsator having caused a vacuum to exist between the rubber lining and the outer casing the said rubber lining will assume its normal position as shown in Fig. 9, but upon the pulsator raising the space between the outer casing and the rubber lining to atmospheric pressure the rubber lining will immediately collapse inwardly and assume a shape according to the shape of the openings 64 and 65 and immediately the pulsator exhausts the air from the outer casing the rubber lining will fall back to its normal position. It will be seen that by this construction a collapsing action of the rubber lining is obtained. In the cup illustrated the collapsing is two-sided, but may be one sided or more as desired. We find that the two-sided action is the most satisfactory. It will also be seen that by this construction the amount of rubber employed is small and the shape of the lining is of a very simple nature, namely that of a plain tube. The cost of the rubber lining is thus considerably reduced.

We claim:—

1. Apparatus for the purpose indicated, in combination, teat cups and a claw, a vacuum tank, a milk receiver, a vacuum pipe from said tank to said receiver, a milk pipe leading to said milk receiver to which said claw and teat cups are connected, an ejector chamber to said receiver, and a pulsator adapted to alternately admit and extract air from said chamber substantially as set forth.

2. In apparatus for the purpose indicated, a receiver connected respectively with the milk and vacuum pipes and having a gravity discharge valve at or near its bottom, an ejector chamber connected with said receiver and adapted to receive the milk discharged through the said discharge valve, means whereby the ejector chamber may be automatically and alternately connected with vacuum and with air, and a gravity discharge valve for the ejector chamber substantially as set forth.

3. In apparatus for the purpose indicated, a receiver connected respectively with the milk and vacuum pipes and having a gravity discharge valve at or near its bottom, an ejector chamber connected with said receiver and adapted to receive the milk discharged through the said discharge valve, means whereby the ejector chamber may be automatically and alternately connected with vacuum and with air, a gravity discharge valve for the ejector chamber, and means upon the receiver and the ejector chamber for making an air-tight joint between the receiver and the chamber by the weight of such chamber.

4. In apparatus for the purpose indicated, a receiver connected respectively with the milk and vacuum pipes, said receiver being provided with an opening in the side of the bottom thereof, a valve seating fixed to the said receiver at said opening, an ejector chamber adapted to hang from a projection on said valve seating, a gravity discharge valve for the ejector chamber, means whereby the ejector chamber may be automatically and alternately connected with the vacuum and with air, a rubber ring between said chamber and valve seating whereby an air-tight joint is made by virtue of the weight of said chamber, and a gravity discharge valve for said opening.

5. In apparatus for the purpose indicated, a pulsator comprising a casing having a semi-circular valve race and ports opening into the valve race, and a slide valve fitting in the valve race and provided with a recess adapted to connect said ports.

6. In apparatus for the purpose indicated, a pulsator comprising a casing having a semi-circular valve race, ports opening into the valve race, a slide valve fitting in the valve race and provided with a recess adapted to connect said ports, one of said ports adapted to establish communication with the valve race and the space between the inner lining and outer wall of the teat cup and also adapted to be alternately in communication with the recess in said slide valve and with the atmosphere, said other port being in communication with said recess in said slide valve and with the vacuum.

7. In apparatus for the purpose indicated, a pulsator comprising a casing having a semi-circular valve race and ports opening into the valve race, a slide valve fitting in the valve race and provided with a recess in its under side adapted to connect said ports, a lug projecting from said valve whereby it may be reciprocated, and guides secured to flanges on said casing for retaining said valve in position.

8. In an apparatus for the purpose specified, a pulsator comprising a flanged casing having a semi-circular valve race and ports opening into the valve race; a side valve fitted in the valve race, and provided with a recess for connecting said ports, a lug for reciprocating the valve; and guides screwed to the flanges of the casing for retaining the valve in position.

9. In apparatus for the purpose indicated, a teat cup comprising an inner casing provided with openings, an outer casing adapted to be connected to a pulsator, a rubber lining fitting within said outer casing, the collapsing of the rubber lining in an inward direction being allowed by said openings in said inner casing, and means for securing the parts together, substantially as set forth.

10. In apparatus for the purpose indicated, a teat cup comprising an outer casing, an inner casing, a rubber lining around the inner casing, said casing having openings, and means for securing a positive collapsing action of the rubber lining by means of the openings in the inner casing.

11. In apparatus for the purpose indicated, a teat cup comprising an inner casing provided with openings, an outer casing adapted to be connected to a pulsator, a rubber lining fitting within said outer casing, the collapsing of the rubber lining in an inward direction being allowed by the openings in the said inner casing, means for securing the parts together, the internal surface of the outer casing being provided with a port in order that an equal distribution of air pressure from the pulsator may be obtained upon the rubber lining, substantially as set forth.

In testimony whereof, we have signed this specification in the presence of two subscribing witnesses.

CLAUDE HUDSON DAVIS.
ALAN DEVEREAUX CUFF.

Witnesses:
D. M. MENCHIE,
A. D. BRODIE.